United States Patent [19]

Seib

[11] Patent Number: 4,940,252

[45] Date of Patent: Jul. 10, 1990

[54] REMOVABLE CONTAINER CASTER ASSEMBLY WITH TOW CAPABILITY

[75] Inventor: Bill G. Seib, Friendswood, Tex.

[73] Assignee: Grumman Aerospace Corporation, Bethpage, N.Y.

[21] Appl. No.: 340,117

[22] Filed: Apr. 13, 1989

[51] Int. Cl.$^5$ ............................................. B62D 53/06
[52] U.S. Cl. ...................................... 280/418.1; 16/29; 16/30; 280/493; 280/47.131
[58] Field of Search ...................... 16/29, 30, 31 R, 45; 280/43.23, 47.131, 767, 418.1

[56] References Cited

U.S. PATENT DOCUMENTS

| | | |
|---|---|---|
| 790,733 | 5/1905 | Linn et al. ................................. 16/30 |
| 835,492 | 11/1906 | Baker ......................................... 16/30 |
| 4,187,578 | 2/1980 | Little ......................................... 16/29 |
| 4,452,555 | 6/1984 | Calabro ........................ 280/43.23 X |
| 4,611,816 | 9/1986 | Traister et al. ............ 280/47.131 X |

Primary Examiner—Charles A. Marmor
Assistant Examiner—Wook Yoon
Attorney, Agent, or Firm—Pollock, VandeSande & Priddy

[57] ABSTRACT

Individual caster assemblies are removably mounted to the corners of an ISO container. Each of the caster assemblies includes "L" pins which selectably pass through openings formed in corner brackets of the container for receipt in blind bores formed within a caster assembly. The caster assemblies inlcude means for attaching a tow bar to permit transport of a caster-equipped container.

4 Claims, 3 Drawing Sheets

REMOVABLE CONTAINER CASTER ASSEMBLY WITH TOW CAPABILITY

FIELD OF THE INVENTION

The present invention relates to a caster assembly, and more particularly to such an assembly for imparting portability for large storage containers.

BACKGROUND OF THE INVENTION

Large metal storage containers are used in a wide variety of applications. For example, conventionally specified ISO containers are used for transporting international freight. Also, this type of container is used to transport trash from industrial and residential complexes. During the use and transportation of such large containers, it is necessary to move them from place to place. In the past, cranes and forklift devices have been most often employed. However, the use of these machines is time consuming and expensive. Industry has discovered the desirability of using caster systems for rendering these containers portable. However, conventional caster systems are not readily removable and do not incorporate an integral towing capability.

BRIEF DESCRIPTION OF THE INVENTION

The present invention is intended to improve the caster systems available for storage containers such as an ISO container. The caster assembly of the present invention is readily removable from a large ISO container and includes an integral towing capability which enhances its portability. In addition, the device is inexpensive to manufacture which increases its availability for wide use.

The present invention basically includes a bracket capable of securely fitting to a respective corner of an ISO container where it can be selectively locked in place. The bracket of the present invention is provided with holes to which a tow bar can be easily attached. When an end destination is reached, the tow bar can be easily removed and the caster assembly unlocked and removed for re-use.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
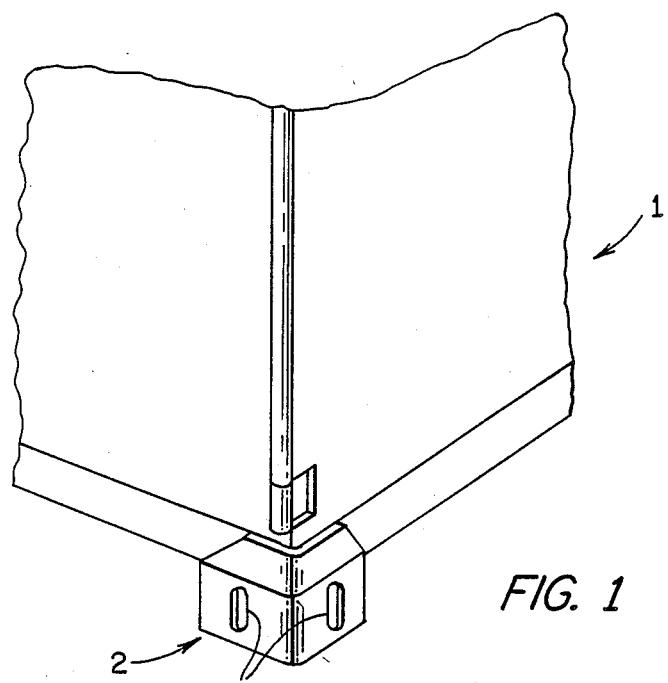
FIG. 1 is a partial perspective view of an ISO container showing a container corner bracket to which the present invention is secured.
Figure 2:
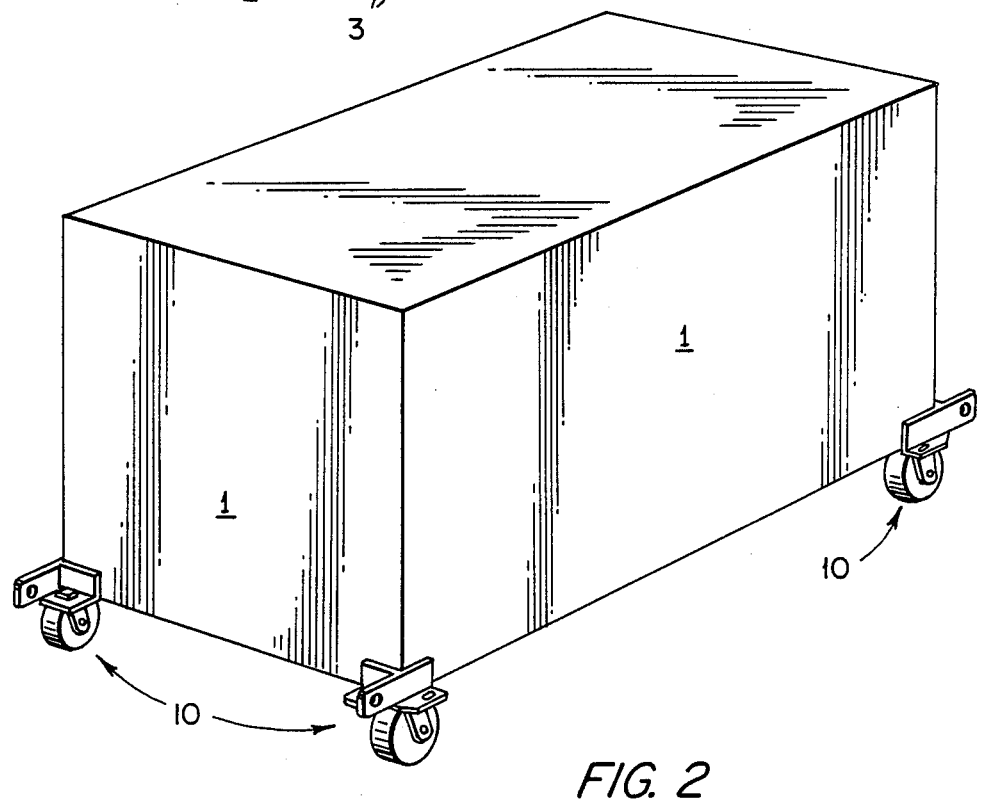
FIG. 2 is a perspective view illustrating the present invention installed on a container.

Referring to the figures, and more particularly FIG. 1 thereof, a container of the conventional ISO type is illustrated. Such containers are characterized by a right angle bracket 2 having orthogonally registered holes 3 formed therein. FIG. 2 illustrates the container 1 with the caster assemblies 10 of the present invention indicated as fastened to the corner brackets 2 of container 1. In FIG. 2 four separate caster assemblies are employed in the respective four corners of the container. As will be described in greater detail hereinafter, each of the caster assemblies 10 has holes formed therein to allow the attachment of a conventional tow bar 4 to two of the adjacently situated caster assemblies at illustrate attachment points 6 thereby permitting the container 1 to be transported by a towing vehicle.

Figure 4:
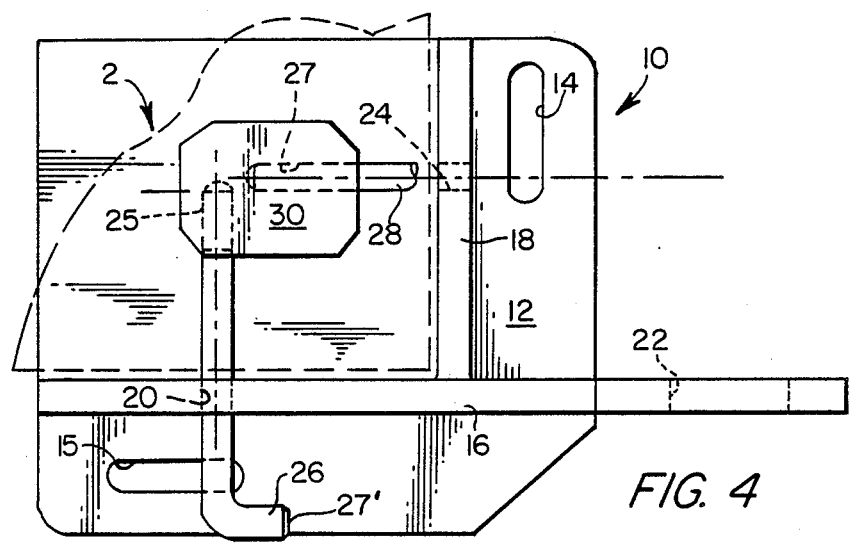
FIG. 4 is a top plan view of the present caster assembly.
Figure 5:
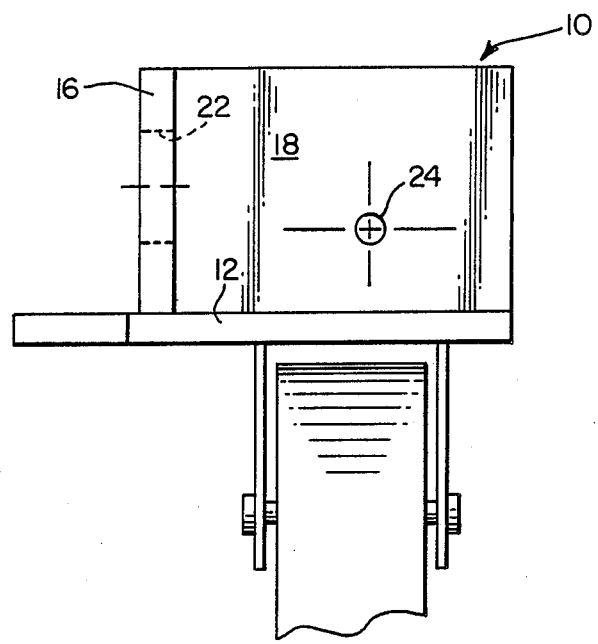
FIG. 5 is an end view of the present invention.
Figure 6:
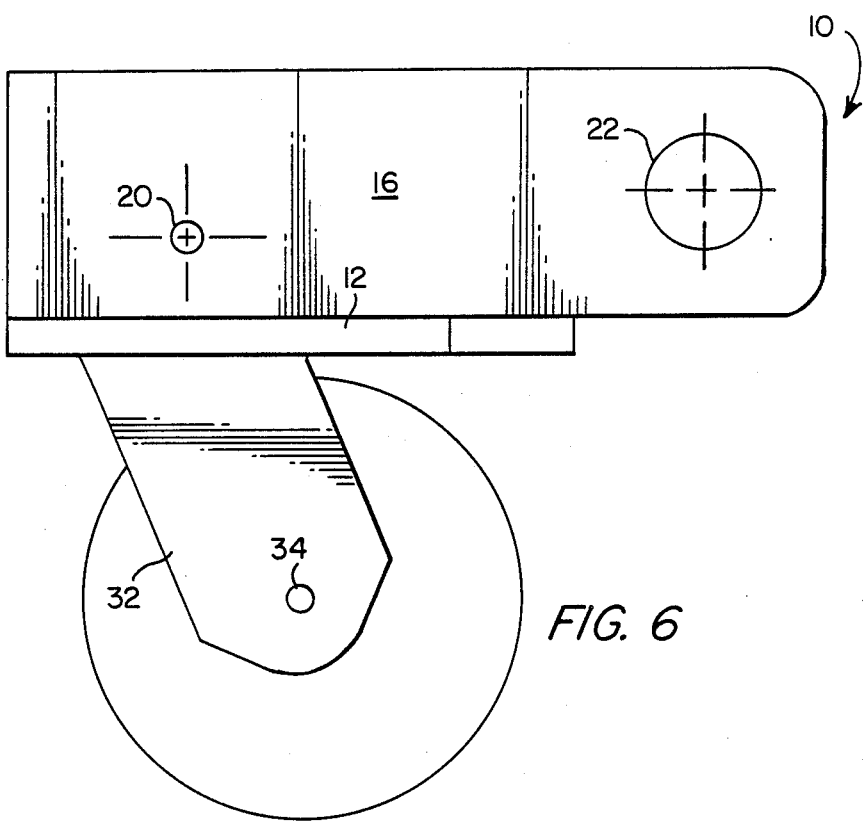
FIG. 6 is a front elevational view of the present invention.

FIG. 4-6 illustrate the structure of a single caster assembly generally indicated by reference numeral 10. The assembly includes a bottom plate 12 that is generally rectangular. Oblong slots 14 and 15 are formed in the upper right-hand and lower left-hand corners of plate 12 for receiving locking pins 28 and 26, respectively, as will be shortly explained in greater detail. A vertical generally rectangular plate 16 is orthogonally welded to plate 12. Vertical plate 16 is disposed along a lower edge section of plate 12 and, along with a second vertical plate 18, receives container bracket 2 (FIG. 1), as illustrated by the dotted lines in FIG. 4. The plate 18 is welded along a bottom edge thereof to plate 12 while the lower edge of plate 18, as pictured in FIG. 4, is welded to a confronting surface of plate 16.

A through-bore 20 is formed in plate 16 to enable an "L" pin 26 to be passed therethrough. The pin will likewise pass through an aligned hole 3 (FIG. 1) in container bracket 2 for receipt into an blind bore 25 formed within an aligned face of an upstanding solid block 30. Similarly, a pin 28 is passed through a through-bore 24 in plate 18 then hole 3 (FIG. 1) in bracket 2 for receipt in a blind bore 27 formed within an orthogonal face of block 30. Pins 26 and 28 are identical and have a right-angled finger grasp portion 27' which facilitates insertion and removal of the pins within the respective blind bores 25 and 27. When the pins have been inserted fully into their respective blind bores, the finger-grasping portions 27' are rotated until received within oblong slots 14 and 15 thereby preventing their inadvertent retraction during use. With the pins 26 and 28 inserted, the caster assembly 10 is secured to the container 1. Counter-rotation of the pins 26 and 28 to the position shown in FIG. 4 will allow their retraction to facilitate quick removal of the caster assembly from the container.

The bottom plate 12 mounts a clevis 32 therebeneath through which an axle 34 passes for rotationally mounting a wheel 36. The wheel 36 may be fixed or swivel mounted. Further, the wheel may be solid or adapted to carry a small pneumatic tire.

Figure 3:
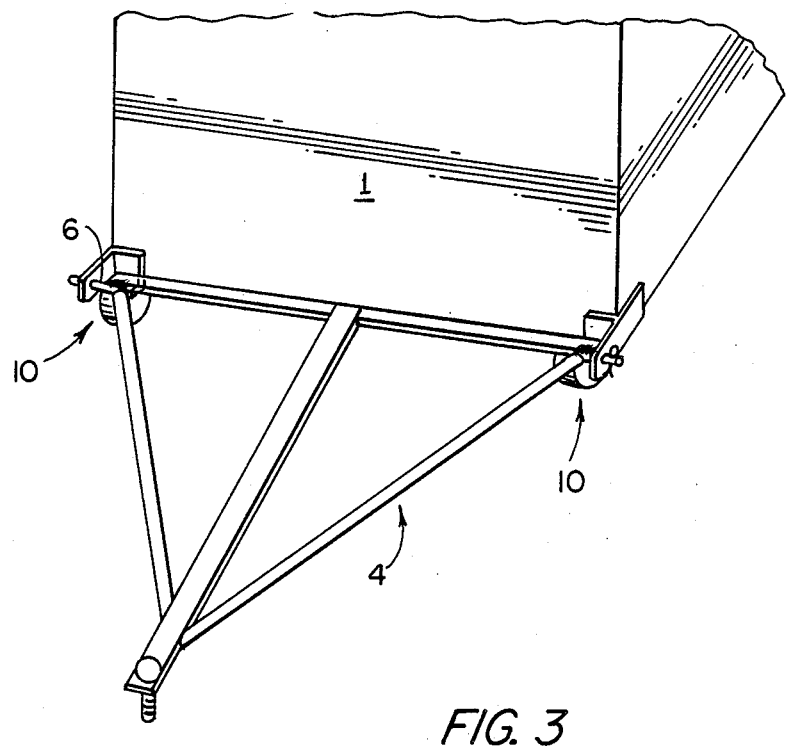
FIG. 3 is a perspective view illustrating the attachment of a tow bar to the present invention thereby allowing transport of a container.

The forward portion of plate 16 includes a through-bore 22 which allows attachment, such as at points 6 (FIG. 3) of the caster assembly 10, to a tow bar 4 (FIG. 3) of conventional structure. Thus, after the casters are mounted to a container (FIG. 2) and the tow bar is attached to two adjacent caster assemblies (FIG. 3), a towing vehicle (not shown) can transport the container 1 from one place to another. After the container is moved to its final destination, the wheels may be removed as simply as they were installed for re-use.

Although the present invention was described in terms of ISO containers, it is to be understood that prefabricated sheds, trailers, or portable living quarters may similarly be transported.

It should be understood that the invention is not limited to the exact details of construction shown and described herein for obvious modifications will occur to persons skilled in the art.

I claim:

1. A simply removable caster assembly for an ISO-type container, the assembly comprising:
   a baseplate and two orthogonal plates standing unwardly relative to the baseplate for receiving a corner bracket of a container;
   a block fixed at its lower end to the baseplate and extending in spaced parallel relation to the orthogonal plates for engaging a corner of a container;
   caster means fastened to the baseplate and extending downwardly for allowing the assembly to be rolled;
   means formed in the assembly for permitting the attachment of a tow bar; and
   an L pin for removably fastening the assembly to a container corner including
   (a) a first section passing through a through-bore formed in one of the orthogonal plates for receipt within a blind bore formed in a confronting surface of the block; and
   (b) a second section rotatable for engagement by a slot formed in the baseplate thereby selectively securing the L pin in place.

2. The structure set forth in claim 1 together with a second L pin having
   (a) a first section passing through a through-bore formed in the remaining orthogonal plate for receipt within a second blind bore formed in a corresponding confronting surface of the block; and
   (b) a second rotatable for engagement by a second slot formed in the baseplate thereby selectively securing the second L pin in place.

3. A transportable ISO type container comprising:
   a housing having four lower corner brackets;
   four simply removable caster assemblies each connected to a respective bracket and comprising:
   a baseplate and two orthogonal plates standing upwardly relative to the baseplate for receiving a corner bracket of a container;
   a block fixed at its lower end to the baseplate and extending in spaced parallel relation to the orthogonal plates for engaging a corner of a container;
   caster means fastened to the baseplate and extending downwardly for allowing the assembly to be rolled;
   a tow bar removably attached to two adjacent assemblies for towing the container;
   an L pin for removably fastening the assembly to a container corner including
   (a) a first section passing through a through-bore formed in one of the orthogonal plates for receipt within a blind bore formed in a confronting surface of the block; and
   (b) a second section rotatable for engagement by a slot formed in the baseplate thereby selectively securing the L pin in place.

4. The structure set forth in claim 3 together with a second L pin having
   (a) a first section passing through a through-bore formed in the remaining orthogonal plate for receipt within a second blind bore formed in a corresponding confronting surface of the block; and
   (b) a second section rotatable for engagement by a second slot formed in the baseplate thereby selectively securing the second L pin in place.

* * * * *

UNITED STATES PATENT AND TRADEMARK OFFICE
CERTIFICATE OF CORRECTION

PATENT NO.   :   4,940,252
DATED        :   July 10, 1990
INVENTOR(S)  :   Bill G. Seib It is certified that error appears in the above-identified patent and that said Letters Patent is hereby corrected as shown below:

In the title page, in the Abstract, line 7, change "inlcude" to --include--.

Column 2, line 9, change "illustrate" to --illustrated--.

Column 2, line 12, change "FIG." to --FIGS.--.

Column 2, line 30, change "an" to --a--.

Column 3, bridging lines 8 and 9, change "unwardly" to --upwardly--.

Column 4, line 1, after "second" insert --section--.

Signed and Sealed this

Ninth Day of July, 1991

Attest:

HARRY F. MANBECK, JR.

*Attesting Officer*           Commissioner of Patents and Trademarks